Jan. 31, 1967
H. H. HEFFRING
3,301,155
SEISMOGRAM PRINTING
Filed Sept. 18, 1964
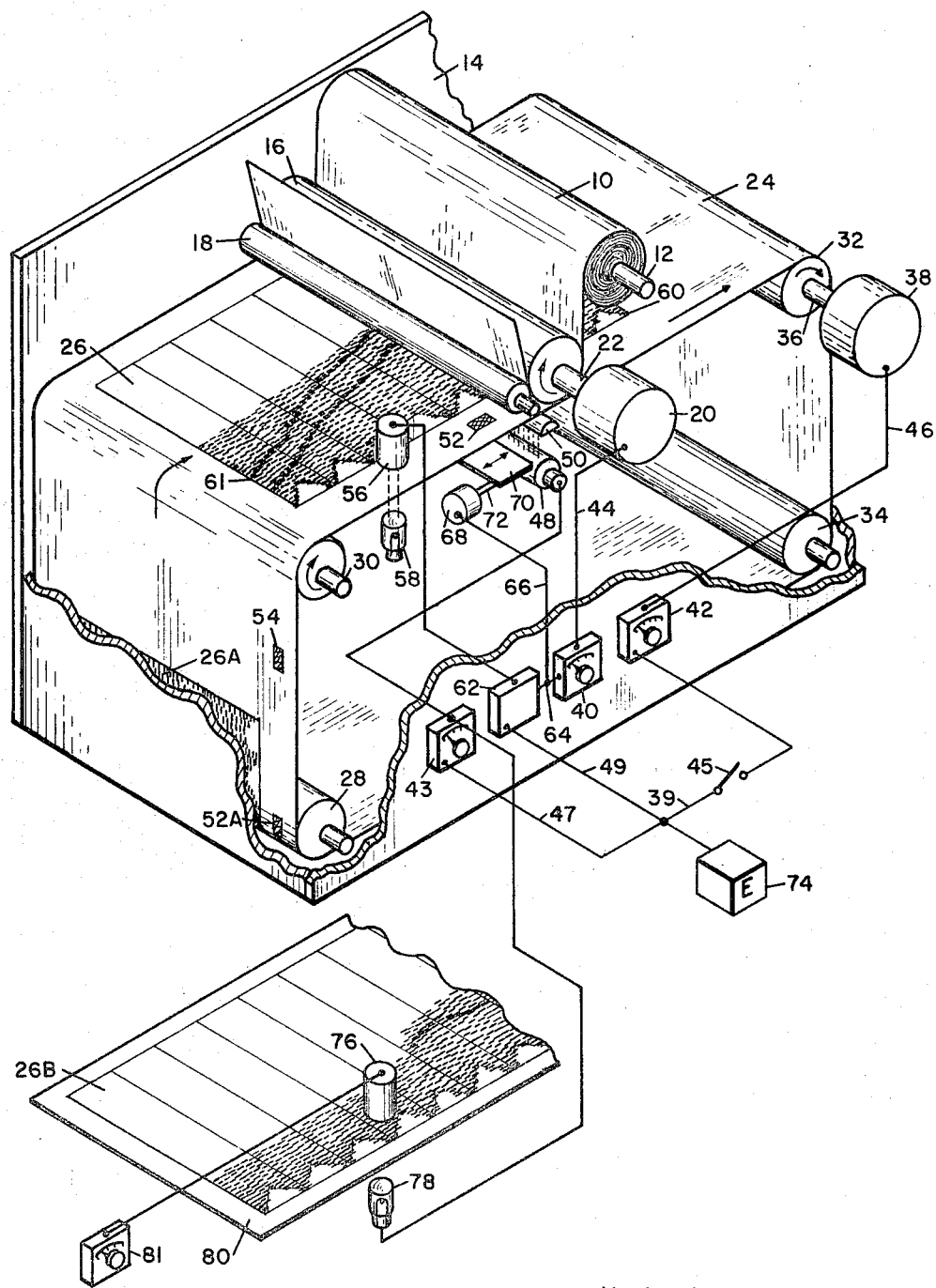
Harland H. Heffring
INVENTOR.
BY John D. Gassett
ATTORNEY United States Patent Office 3,301,155
Patented Jan. 31, 1967

3,301,155
SEISMOGRAM PRINTING
Harland H. Heffring, Calgary, Alberta, Canada, assignor, by mesne assignments, to Esso Production Research Company, Houston, Tex., a corporation of Delaware
Filed Sept. 18, 1964, Ser. No. 397,532
7 Claims. (Cl. 95—75)

This invention relates to reproducing seismic sections. It relates particularly to a system for reproducing seismic sections in a form easier to interpret. It relates especially to a differential contact printer whereby the relationship of horizontal to vertical scale of a seismic section can be changed.

Geophysical prospecting procedures using artificially induced seismic disturbances have found wide application in the search for petroleum and other mineral deposits. In all of these methods it is general practice to initiate an explosion or other seismic disturbance at a point near the surface of the earth to direct seismic waves downwardly into the earth from that point. The waves continue to travel downward within the earth until they encounter discontinuities in the earth structure in the form of various substrata formation and the like. The discontinuities have the effect of reflecting at least a portion of the seismic waves back toward the surface of the earth. By arranging a plurality of geophones or other seismic transducers at spaced points from the seismic disturbance points, it is possible to detect the arrival of the reflected seismic waves at the surface of the earth. Furthermore, by using accurate timing devices and recording means, it is possible to determine not only the magnitude of the signal received by the various geophones, but also to measure the time required for the seismic waves to travel from the disturbance points down to the various discontinuities and then to the geophones.

In the past it has been the general practice to amplify the seismic signal generated by the geophone and record the signal by means of a suitable camera. The recording means may take the form of a recording oscillograph or, as is more recently the case, it may take the form of a magnetic photographic recording device capable of recording a signal in reproducible form. It is this amplified record signal which the seismic computers or interpreters study.

Most conventional seismographs (that is devices for recording seismic signals) are capable of recording up to 24 or more seismic signals simultaneously. Thus, if a seismic observation results in 24 seismic signals being generated at as many detection stations, the resulting seismogram is a 24 trace record of the resulting 24 signals. The traces are usually arranged in a side-by-side manner and timing marks indicating predetermined time intervals are simultaneously recorded with the seismic signals to indicate the amount of time along each trace.

In this description, it is assumed that the term "seismic trace or channel" is intended to mean the record formed on a recording medium by the reception of a train of signals from an individual geophone location. The term "seismogram" is intended to mean a multiple trace recording of a plurality of geophone signals from a seismic observation. The term "seismic section" shall be intended to mean a seismogram prepared from one or more seismograms. The individual traces that form the seismic section are arranged in the same lateral order as the geophone locations corresponding to the traces; and the distance between the centers of variable density traces are preferably proportional to the distance between the geophone locations so as to render the final production a reasonably accurate map or vertical cross-section of the portion of the earth under study.

Frequently, after several seismic sections have been prepared, it is desired to place them in a side-by-side relation to form a larger or regional seismic section which increases the section or portion of earth under study. For convenience, the larger group of seismic sections which are arranged in a side-by-side relationship may be called a regional seismic section.

Once a seismic section has been made, persons skilled in the art are able to determine from the data recorded on the seismogram certain characteristics of the earth's substrata in the vicinity of the seismic observation.

The accuracy of exploration by seismic methods depends to a large extent upon the ability of an observer to analyze the recorded seismic information. It has been found that variable density records, in which each signal is reproduced as a photographic trace which varies in intensity along its length in proportion to the intensity of the signal, are more easily analyzed than other types of records.

In working on variable density sections most interpreters view such sections from a side edge at a low angle so that dip structure, pinch out, etc., stand out more clearly. In doing this, interpreters are looking at a section which has, in effect, been compressed in one direction. In order to get a more generalized picture of a larger area, the interpreters prefer to place the seismic sections in a side-by-side relationship so as to obtain a larger regional section. The present invention includes a novel system for compressing a seismic section in one direction as desired while it is being reproduced.

Various objects and an understanding of the invention can be had from the following description taken in conjunction with the drawing which shows an embodiment featuring concepts of this invention.

In the drawing means are provided for moving a recording medium in relation to a seismic section and in which there is limited contact between the recording medium and the seismic section. This limited contact takes a form of a relatively straight narrow line. Shown in the drawing is a roll of photographic paper or a recording medium 10 supported about roll or spool 12 which is supported from frame 14 in a conventional manner. A recording medium such as photographic paper 10 is fed between rollers 16 and 18. Roller 16 can conveniently be called a power roller and roller 18 can be called a pressure roller. Paper 10 advances between the two rollers when roller 16 is driven by motor 20. The power output of motor 20 is connected through shaft 22 to roller 16. Shaft 22 is supported from frame 14 is a conventional manner. Motor 20 is of a type which automatically brakes itself when the power supply thereto is cut off. Such a motor is commercially available from Motomatic-Electro-Craft Corporation, Hopkins, Minnesota, for example.

Attention will now be directed toward that part of the drawing which carries the film or negative of the seismic section beneath the roller 16 in line contact with paper 10. This includes a transparent carrier which conveniently can take the form of an endless transparent belt 24. In operation, either a single seismic section 26, or a plurality of seismic sections 26 and 26A are mounted upon belt 24. There are only two seismic sections illustrated in the drawing as being mounted upon endless transparent belt 24; however, any practical number can be mounted thereon. The transparent belt 24 is supported by rollers 28, 30, 32 and 34 which are conventionally supported from frame 14. Roller 32 is connected through shaft 36 to motor 38. Motor 38 can be similar to motor 20.

Roller 16 turns in the direction of the arrow which is in the opposite direction of the movement of the transparent belt which is indicated by the arrows on rollers 30 and 32. Roller 16 is spaced so that photographic recording medium 10 comes in essentially a straight line contact with seismic section 26 as it is rotated beneath roller 16. In other words, the transparent belt 24 is held essentially tangent to the periphery of roller 16. The electric source of energy for motor 20 is controlled, for example, by rheostat 40. The speed of motor 38 is controlled by rheostate 42. An electrical source 74 is connected through conduit 39 having switch 45 to rheostat 42. The source 74 is connected through conduit 47 to rheostat 43 and through conduit 49 to a control means 62. Conduits 44 and 46 connect motors 20 and 38 respectively to rheostats 40 and 42.

Attention is next directed toward means for exposing the photographic paper 10 at the line of contact with the seismic section. This is conveniently accomplished by placing an elongated light source 48 beneath transparent belt 24 aligned with the line of contact between roller 16 and the transparent belt 24. Spaced between light source 48 and transparent carrier 24 is cylindrical lens 50 which direct light from the elongated light source 48 into a relatively fine, straight line. The light from cylindrical lens 50 passes through transparent carrier 24 and exposes the film 10 in accordance with the portion of the seismic section 26 which is making a line contact with the recording medium 10.

When there is no seismic section making line contact with recording medium 10, it is desired that no light from light source 48 strikes the recording medium. It is also desired that the recording medium 10 be stopped during the time that no seismic section is making contact with the recording medium. Means for accomplishing this will now be discussed. Shown on the edge of transparent carrier 24 is a first opaque patch 52 and a second patch 54. The two patches are spaced apart a distance the length of seismic section 26. Mounted above the transparent carrier 24 is a photoelectric cell 56 and beneath the transparent carrier is a light source 58. Light source 58 and photoelectric cell 56 are arranged so that light from source 58 passes through carrier 24 and strikes cell 56. Patch 52 is spaced a distance from end 60 of section 26 which is equal to the distance of the point, which light from light source 58 passes through transparent carrier 24, from the line contact between recording medium 10 and the seismic section. When opaque section 52 passes between light 58 and photocell 56, photocell 56 sends a signal to gate control means 62. Gate control means 62 can include a flip-flop with toggle input. The input to control means 62 is connected to voltage source 74. The output of control 62 is connected to conduit 64 to rheostat 40 and to conduit 66 leading to solenoid 68. The control means 62 passes electric power only after every other pulse from photocell 56. In other words, one pulse from photocell 56 causes control means 62 to pass the electric power and the next pulse causes the control means to be non-conductive. A suitable control means 62 is commercially available from Guardian Electric Manufacturing Company located at Chicago, Illinois, and identified as RC–100–BR Latch Relay.

Solenoid 68 is connected to a movable light shield 70 by connecting rod 72. When solenoid 68 is unenergized, the light shield is biased so that it moves into the light path and shuts off the light from light source 48 to cylindrical lens 50. When solenoid 68 is energized it pulls shield or shutter 70 toward it, thus permitting light from light source 48 to expose the film 10. As the output lead from control means 62 is connected to both solenoid 68 and motor 20 whenever the motor is stopped the exposing light is blocked and when motor 20 is rotating the light is unblocked. The usefulness of this arrangement will become apparent under the discussion hereinafter of the operation of the device.

Sometimes a seismic section, such as section 26, may have a different relative average density from the negative of another section such as section 26A. Means are provided for measuring the relative average density of the negative so that the exposing light source can be adjusted to produce successive prints whose neutral density is the same. This includes a photoelectric cell 76 which is preferably the wide area type and a light source 78. A frame 80 is provided between photoelectric cell 76 and light 78. Mounted on frame 80 is a seismic section 26B. Connected to the output of photoelectric cell 76 is a meter 81. Photocell 76 is moved with respect to section 26B so as to obtain a representative reading on meter 81 of the average density of the section. Rheostat 43 is adjusted so that a desired density reading on meter 81 is obtained. This setting on rheostat 43 is then used when exposing section 26B. Thus, the proper average density of the image reproduced on paper 10 will be obtained.

A brief discussion will now be had of the operation of the device and the drawing. First, the average density of each section 26, 26A, 26B, etc., which are to be used to make up the regional seismic section, is determined. The proper setting of rheostat 43 for each of the individual sections is thus determined.

Before the motors 20 and 38 are energized, rheostat 43 is set to give the desired intensity of light for light 48 for seismic section 26. Rheostat 40 is adjusted so that motor 20 advances the paper at such a speed that allows correct range of exposure for paper 10 chosen. Rheostat 42 is set to give a proper speed of motor 38 in relation to the speed of motor 20 which is determined by the setting of rheostat 40. The relative speeds are determined by the desired distortion of the reproduction of the sections. Before motors 20 and 38 are started, opaque patches 52 and 54 are placed upon transparent belt 24 and properly spaced for each seismic section carried by the transparent carrier. A roll of unexposed recording medium 10 is placed upon roller or spool 12 and threaded through between rollers 16 and 18. The speed for the recording paper 10 is determined by considering the photographic speed of the paper and the density range on the negative to be processed. Rheostats 40 and 42 are adjusted to give the proper speed relation between motors 20 and 38 to obtain a proper distortion of the seismic section 26 when it is reproduced on recording medium 10. After these adjustments and preparations are made, switch 45 is closed which starts motor 38 turning at the desired rate of rotation according to the setting of rheostat 42. This drives section 26 into contact with paper 10. When this occurs, patch 52 interrupts the light from light 58 to photocell 56 which causes a pulse to be transmitted to control means 62. Upon receiving the first pulse, control means 62 is rendered conductive and permits passage of current therethrough. Two things then occur. (1) Shutter 70 is opened upon energization of solenoid 68 and (2) the motor 20 is started and rotates at a speed as determined by the setting of rheostat 40. Thus, the moment that the end 60 of sesimic section 26 comes into contact with the medium 10, medium 10 begins to move and is driven by motor 20. The line contact printing continues until patch 54 interrupts the light from light sources 58 to the photocell 56 which again emits a pulse in the form of a change of voltage level which is transmitted to control means 62. This indicates that the end 61 of seismic section 26 has reached the line contact. Upon receiving the second pulse, control means 62 enters its second or nonconductive state so that motor 20 is de-energized and stops immediately. Solenoid 68 is likewise simultaneously de-energized and shutter 70 returns to its normal position, blocking the light from light source 48.

Motor 38 continues to rotate and moves transparent carrier 24 until the next section 26A is in position to be printed. At this time, patch 52A interrupts light from light source 58 and sends another pulse to control means 62. This results in energizing both solenoid 68 and motor 20. This again does two things. It starts the film and it permits light to expose the recording medium. It is seen that the reproductions of sections 26 and 26A on recording medium 10 are placed in a side-by-side relationship. This, in a sense, is automatic splicing of successive sections and eliminates considerable manual labor. It is also clear that from proper adjustments of rheostats 40 and 42 that any scale ratio can be quickly obtained. It is seen that there are no special preparations required of the input material. The film negatives of the seismic sections are used as they are obtained.

Alternatively, the device shown in the drawing can be operated by placing only one seismic section 26 at a time on the endless transparent belt 24. When only one seismic section is used at a time, patch 52 can be permanently fixed upon transparent belt. Section 26 is then attached to the belt so that end 60 is the required distance from patch 54 similarly as shown above. To accommodate for different lengths or widths of sections 26, patch 54 is placed at the proper position with respect to end 61 of the section. Paper 10 is moved and exposed only during that time that it is in contact with section 26 similarly as described above. As soon as one section 26 is reproduced on the photographic paper 10, endless belt 24 is stopped and another section placed on the belt similarly as described above. Automatic splicing and the same high quality regional seismic section is attained when using only one section on the belt at a time as just described as when using a plurality of sections.

While there is disclosed above but one embodiment of the system of the invention herein presented, it is possible to produce still other embodiments without departing from the inventive concept herein disclosed. It is, therefore, desired that only such limitations be imposed on the appended claims as are stated therein.

What is claimed is:
1. A device for making a contact print of a plurality of seismic sections in which the seismic section comprises a plurality of side-by-side traces which comprises:
   an elongated transparent carrier means upon which a plurality of seismic sections are placed;
   a recording medium;
   means to effect essential line contact between said recording medium and said first carrier means, said line being essentially parallel to the traces on said seismic sections;
   first driving means to move said carrier means in a direction perpendicular to said line of contact;
   second driving means to move said recording medium perpendicular to said lines of contact;
   light means for directing a line of light through said contact line so as to expose said recording medium with the line image of said seismic section;
   shutter means for interrupting said line source of light; and
   control means responsive to the position of seismic sections on said transparent carrier means for operating said shutter means such that said light line is interrupted when that part of said first carrier means adjacent said contact line has no seismic section thereon;
   said control means including a light source on one side of said transparent carrier means and a photoelectric cell on the other side, opaque patches on said transparent carrier aligned to interrupt the light from said light source and said photo light cell, and a solenoid operable to move a light barrier into the path of said line light upon alternating changes in the output of said photoelectric cell.

2. An apparatus as defined in claim 1 including means to de-energize said second driving means concurrently with the interruption of said line of light.

3. An apparatus as defined in claim 1 including means to determine the average density of a seismic section and means to adjust the intensity of the line of light in accordance with the average density so determined.

4. A device for making a contact print of a plurality of seismic sections in which the seismic sections comprise a plurality of side-by-side traces which comprises:
   an elongated transparent carrier means for carrying said seismic sections;
   a flexible photographic recording medium;
   first driving means to move said transparent carrier means;
   a driving roller;
   means to support said driving roller adjacent and tangential to said transparent carrier means, the tangential line being perpendicular to the movement of said transparent carrier;
   a pressure roller adjacent said driving roller;
   second driving means for driving said driving roller such that the tangential direction of movement is in an opposite direction to that of the transparent carrier;
   a line light source aligned with said tangential line and on the opposite side of the transparent carrier from said recording medium;
   shutter means for interrupting light from said light source;
   control means responsive to the position of the seismic sections on said transparent carrier means such that said control means is non-conductive only when that part of said transparent carrier means adjacent said tangential line has no seismic section thereon;
   a solenoid means connected to said shutter means, said solenoid, upon energization, removing said shutter means from said line source of light;
   a voltage source; and
   a conduit means connecting said voltage source through said control means to said solenoid and to said second driving means.

5. An apparatus as defined in claim 4 including first regulating means to control the speed of said first driving means and second regulating means for controlling the speed of said second driving means.

6. An apparatus as defined in claim 5 including means to determine the relative density of a seismic section and means to adjust the intensity of the line of light.

7. An apparatus as defined in claim 5 in which the control means include a light source on one side of said transparent carrier means and a photoelectric cell on the other side, opaque patches on said transparent carrier aligned to interrupt the light from said light source and said photo light cell coincident with a seismic section beginning and ending contacts with said recording medium.

References Cited by the Examiner
UNITED STATES PATENTS
2,861,507  11/1958  Palmer _____ 95—75

NORTON ANSHER, *Primary Examiner.*

JOHN M. HORAN, *Examiner.*

R. A. WINTERCORN, *Assistant Examiner.*